United States Patent [19]

Nihongi

[11] Patent Number: 6,056,821
[45] Date of Patent: May 2, 2000

[54] ELECTROSTATIC POWDER COATING APPARATUS

[75] Inventor: Susumu Nihongi, Miura, Japan

[73] Assignee: Aphe Co., Ltd., Kawaguchi, Japan

[21] Appl. No.: 08/946,247

[22] Filed: Oct. 7, 1997

[30] Foreign Application Priority Data

Jun. 11, 1997 [JP] Japan ................................. 9-167858

[51] Int. Cl.[7] .................................................. B05B 5/00
[52] U.S. Cl. ..................... 118/621; 118/630; 118/632; 118/633; 118/634; 118/58; 118/64; 118/66; 118/69
[58] Field of Search .................................. 118/621, 630, 118/632, 633, 634, 635, 58, 64, 66, 69; 204/624; 427/104, 116, 477; 239/690

[56] References Cited

U.S. PATENT DOCUMENTS

| | | | |
|---|---|---|---|
| 3,889,015 | 6/1975 | English | 118/630 |
| 5,136,973 | 8/1992 | Nies et al. | 118/632 |

*Primary Examiner*—Laura Edwards
*Attorney, Agent, or Firm*—Bacon & Thomas

[57] ABSTRACT

A chemically washed workpiece is heated and degreased by a heating and degreasing section in a process for delivering the workpiece in a base which is then cooled down in a cooling section. The workpiece is then delivered onto the base by a lift-up unit and is coated by the adhesion of the powder coat and the curing operation during the passage of pipes of an electrostic coater, a curing section and the like. Furthermore, the workpiece is again delivered into the base by a lift-down unit and discharged after being cooled down during the passage of pipes of the cooling section i.e., the units of each step being arranged separately into a lower mechanism group and an upper mechanism group, and the cooling section also serving to cool the workpiece after the heating, degreasing and curing. Accordingly, the overall length of the apparatus is shortened. Also, since the electrostic coater, an workpiece outer circumference cleaner and the cuing section are covered by independent dust protecting covers, dust collecting efficiency for the floating powder coat is enhanced.

2 Claims, 12 Drawing Sheets

ELECTROSTATIC POWDER COATING APPARATUS

BACKGROUND OF THE INVENTION

The present invention relates to an electrostatic powder coating apparatus used as a partial coating device for a workpiece such as an armature of a motor or the like and for curing a powder coat electrostatically adhered to the surface of the workpiece for coating.

A typical prior art coating system for partially coating a workpiece such as an armature of a motor or the like is shown in FIG. 19. Namely, the following units are arranged linearly in series: a heating and degreasing section a for heating and degreasing the workpiece; a first cooling section b for air cooling the workpiece that has been heated and degreased; a jig putting-in unit c for mounting a masking jig onto a non-coated portion of the workpiece; an electrostatic coater d for electrostatically coating a powder coat d that has been laid on the workpiece by air; a workpiece outer circumference cleaner e for removing an extra amount of powder resin coat adhered to the outer circumferential surface of the workpiece; a curing section f for heating and melting the powder coat adhered to a surface to be coated of the workpiece for fixation of the powder coat as a coating film after removal of the powder coat adhered to a masking jig by using a jet flow of air; a second cooling section g for cooling the workpiece that has been heated by the curing section f; and a jig putting-out unit h for removing the workpiece from the masking jig. The surface, to be coated, of the workpiece is coated in a process for delivering the workpiece in order from the heating and degreasing section a to the jig putting-out unit h.

The electrostatic coater d, the workpiece outer circumference cleaner e and the curing section f are covered by a single dust protecting cover i. The dust protecting cover i is connected by a dust collector to a powder coat collection section j through passages of pipes. Namely, the flown powder coat that has not been adhered to the workpiece in the electrostatic coater d or the extra powder coat that has been removed from the workpiece in the work outer circumference cleaner e or the powder coat that has been removed from the surface of the masking jig by an air injection means provided in the curing section f are floated within the dust protecting cover i and absorbed and collected by the powder coat collecting section j to be fed to the electrostatic coater d. Also, the masking jig that has been removed from the workpiece in the jig putting-out unit i is fed back to the jig putting-in unit c to be reused in the jig putting-in unit c.

However, according to the above-described prior art, it is pointed out that, due to the fact that the sections from the heating and degreasing section a to the jig putting-out unit h are arranged and disposed linearly in series and further due to the fact that the two cleaning sections (first and second cooling sections b and g) that need a relatively large volume for cooling the heated workpiece in the transfer process are arranged downstream of the heating and degreasing section a and downstream of the curing section f, the apparatus as a whole is long in length and a large working space is required. Also, since the dust protecting cover i covers the electrostatic coater d, the workpiece outer circumference cleaner e and the curing section f as a whole so that its volume is enlarged, the powder coat diffused in the space within the dust protecting cover i is not immediately absorbed or collected in the powder coat collecting section j but is likely to be adhered to the surface of the equipment contained in the dust protecting cover i or the inner surface of the dust protecting cover i or the like. It is therefore necessary to clean the interior of the dust protecting cover i at least once a week.

SUMMARY OF THE INVENTION

In view of the foregoing defects inherent in the prior art, a main object of the present invention is to provide an electrostatically powder coating apparatus that may be miniaturize the overall size and reduces an amount of the powder coat adhered to the surface of the equipment by enhancing the dust collecting efficiency of the powder coat floating within the dust protecting cover.

This and other objects of the present invention may be attained by the present invention.

Namely, according to the present invention, there is provided an electrostatic powder coating apparatus comprising: a heating and degreasing section for heating and degreasing a workpiece; an electrostatic coater for electrostatically adhering powder coat to a surface of the workpiece; a curing section for heating and melting a layer of the electrostatically adhering powder coat to the surface of the workpiece for fixation thereof; a cooling section for cooling the workpiece which has been heated and degreased and the workpiece which has been cured; and a delivery path for delivering the workpiece through respective parts including said heating and degreasing section, said electrostatic coater, said curing section and said cooling section; wherein a part, passing through said cooling section, of said delivery path is composed of a first delivery path passing from the side of said heating and degreasing section through said cooling section to the side of said electrostic coater, and a second delivery path passing from a side of said curing section through said cooling section to a workpiece discharging side. Incidentally, said electrostatic coater is typically used to raise the powder coat, to give opposite charges to the powder coat and the object to be coated, to electrostatically adhere the resin powder to the surface of the object to be coated by utilizing Coulomb Law.

Accordingly, in the electrostatic powder coating apparatus according to the present invention, the workpiece is first fed to the heating and degreasing section by the first delivery path. The workpiece is heated here so that the residual oil or the like is gasified and removed. Thereafter, the workpiece is fed and cooled down in the cooling section. Subsequently, in the electrostic coater, the powder coat layer is formed on the surface of the workpiece by the electrostatic adhesion of the charged powder coat. Thereafter, the powder coat layer is molten and fixated to form a coating film by the heating in the curing section. Then, the workpiece that has been heated by the curing section is again delivered to and cooled in the cooling section by the second delivery path. Thereafter, the workpiece is discharged. Namely, according to the present invention, since the cooling section also serves as the cooling means of the workpiece that has been heated by the curing section and as the cooling means of the workpiece that has been heated by the heating and degreasing section, it is possible to realize the reduction in length of the overall apparatus.

In a preferred embodiment of the invention in the above-described structure, an upper mechanism group including said electrostic coater and said curing section is arranged on the upper side of a lower mechanism group including said heating and degreasing section and said cooling section; the workpiece that has been fed to an end portion on a terminal point side of said first delivery path passing through said lower mechanism group is lifted up to an end portion on a start point side of said upper delivery path passing through said upper mechanism group; and the workpiece that has been fed to the end portion on the terminal point side of said upper delivery path is lifted down to the end portion on the start point side of said second delivery path passing through said lower mechanism group. With such an arrangement, it is possible to considerably reduce the length of the overall apparatus in comparison with the apparatus in which the respective working portions are connected in series in a line.

Also, in the apparatus, a workpiece outer circumference cleaner is disposed between said electrostatic coater and said curing section for removing an extra amount of the powder coat of the workpiece outer circumferential surface; a jig cleaner is disposed in said curing section for removing the powder coat on a surface of masking jigs mounted on the workpiece; said electrostatic coater, said workpiece outer circumference cleaner and said curing section are covered by independent dust protecting covers, respectively; and the powder coat within the respective dust protecting covers is absorbed and collected to a powder coat collecting section through respective pipes. With such an arrangement, it is possible to reduce a volume of the respective dust protecting covers. Accordingly, powder coat that has been flown is hardly left in the dust protecting covers and the powder coat is absorbed and collected immediately into the powder coat collecting section. It is possible to reduce the amount of the adhesion powder cost to the surfaces or the like of the equipments covered by the dust protecting covers and the inner surfaces of the dust protecting covers.

DESCRIPTION OF THE PREFERRED EMBODIMENTS

Figure 1:
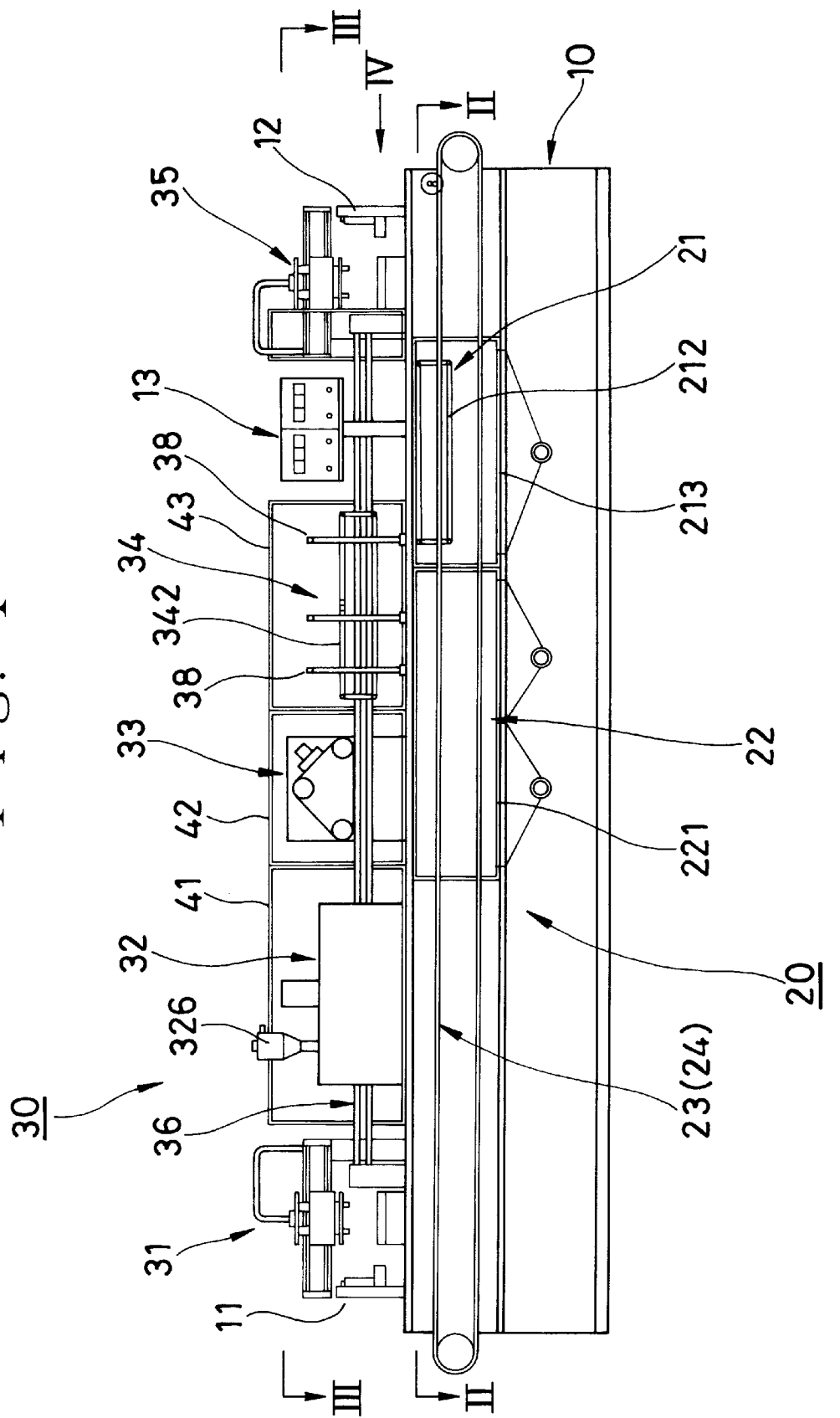
FIG. 1 is a vertical sectional view showing a schematic structure of an electrostatic powder coating apparatus in accordance with a preferred embodiment of the present invention.

FIG. 1 is a view schematically showing an overall structure of an electrostatic powder coating apparatus according to a preferred embodiment of the present invention. Namely, the electrostic powder coating apparatus in accordance with this embodiment is composed of a lower mechanism group 20 disposed within a base 10 and an upper mechanism group 30 disposed on the base 10.

Figure 2:
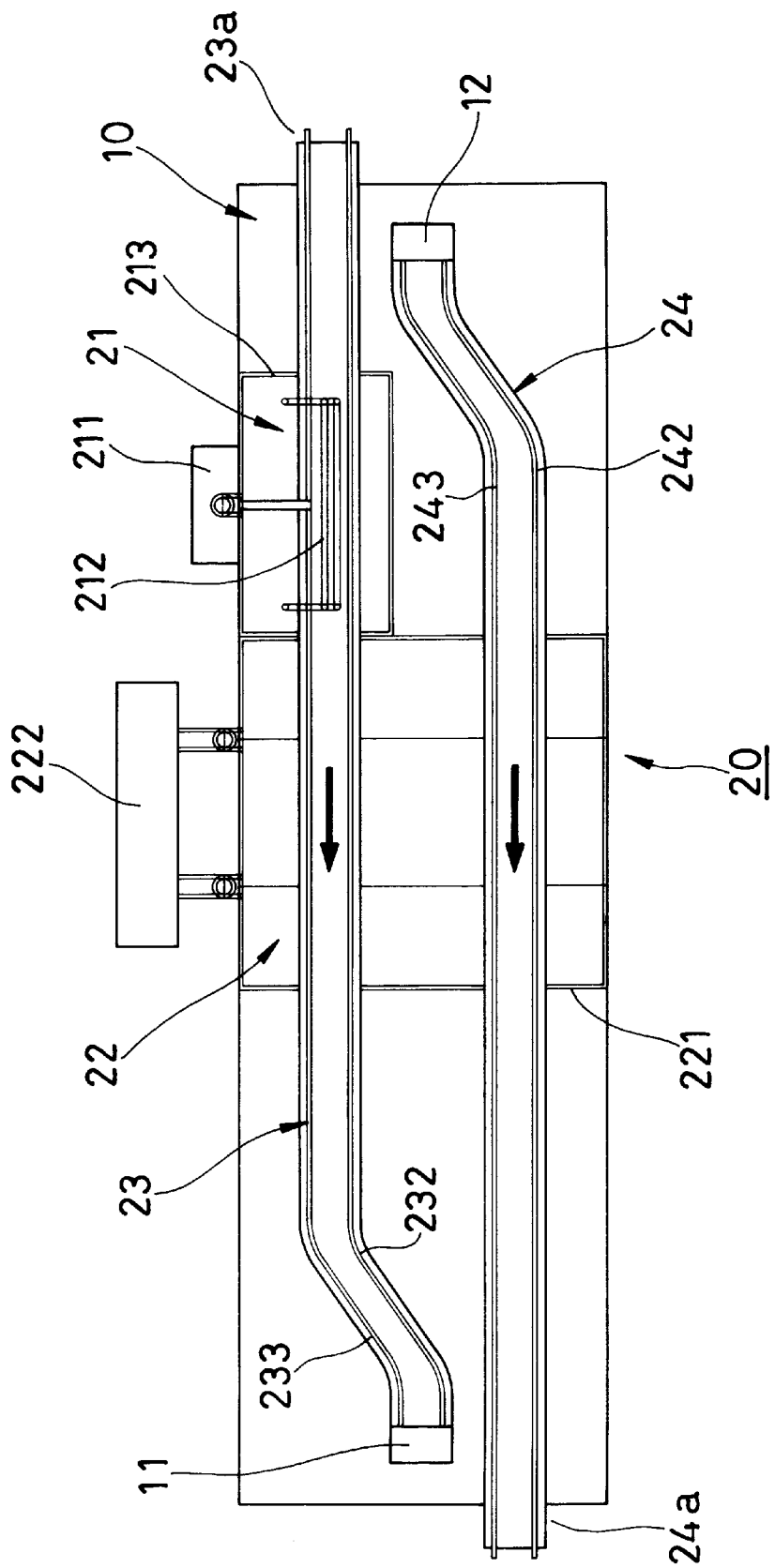
FIG. 2 is an illustration showing a schematic structure of a lower mechanism group taken along the line II—II of FIG. 1 in accordance with the preferred embodiment.
Figure 3:
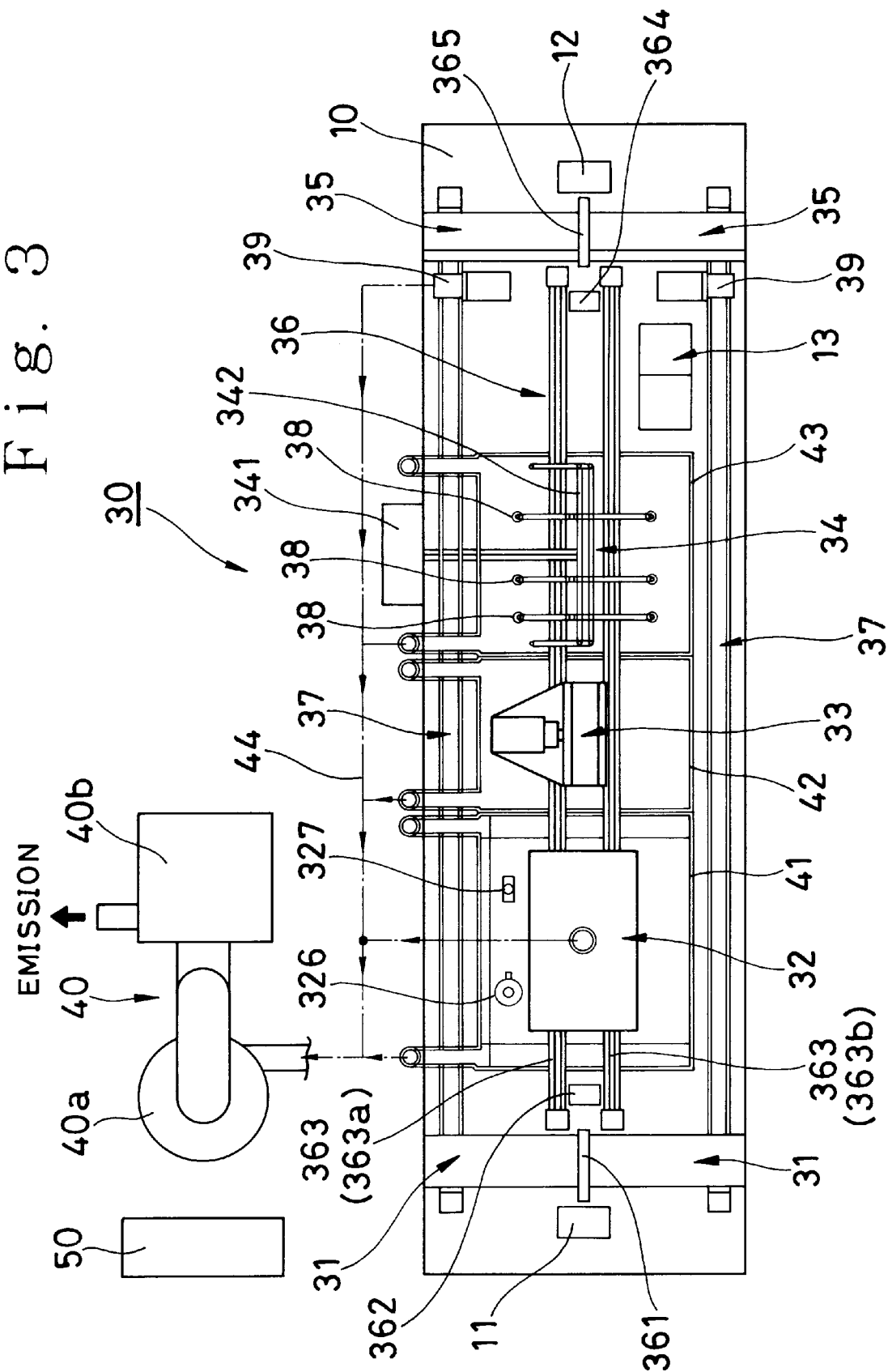
FIG. 3 is an illustration showing a schematic structure of an upper mechanism group taken along the line III—III of FIG. 1 in accordance with the preferred embodiment.

The lower mechanism group 20 is provided with a heating and degreasing section 21 and a cooling section 22. As shown in FIG. 2, a first lower delivery path 23 passing through the heating and degreasing portion 21 and the cooling section 22 in this order and a second lower delivery path 24 passing through the cooling section 22 without passing through the heating and degreasing section 21 are provided in the lower mechanism group 20. Also, as shown in FIG. 3, the upper mechanism group 30 is provided with a jig putting-in unit 31, an electrostatic coater 32, a workpiece outer circumference cleaner 33, a curing section 34 and a jig putting-out unit 35. An upper delivery path 36 passing these components, i.e., from the jig putting-in unit 31 to the jig putting-out unit 35 arranged in line in the workpiece delivery direction is provided in the upper mechanism group 30. The jig putting-in unit 31 and the jig putting-out unit 35 continue with each other through a jig returning path 37.

The first lower delivery path 23 in the lower mechanism group 20 is used to deliver the chemically cleaned non-coated workpiece from a workpiece feeding end portion 23a, located at one end in a longitudinal direction of the base 10, through the heating and degreasing section 21 and the cooling section 22 within the base 10 in this order, to a lift-up unit 11 provided in the vicinity of an end portion opposite the above-described workpiece feeding end portion 23. Also, the second lower delivery path 24 is used to deliver the workpiece, that has been subjected to the coating in the upper mechanism group 30, from a lift-down unit 12, provided in the vicinity of the end portion on the side of the above-described workpiece feeding end portion 23a through the interior of the cooling section 22 to a workpiece discharging portion 24a.

The upper delivery path 36 in the upper mechanism group 30 is composed of a first carrying unit 361, a second carrying unit 362, a pair of delivery screws 363 which are parallel with each other, a third carrying unit 364, and a fourth carrying unit 365. As will be described in more detail later, the first carrying unit 361 is used to receive the workpieces that have been heated and degreased and lifted up in turn from the first lower delivery path 23 in the lower mechanism group 20 by the lift-up unit 11 and to carry the workpieces on the jig putting-in unit 31. The first carrying unit 362 is used to carry the workpiece, on which a masking jig to be described later is loaded in the above-described jig putting-in unit 31, on the end portion on the starting point side of the above-described delivery screws 363. The pair of delivery screws 363 extend through the electrostatic coater 32, the workpiece outer circumference cleaner 33 and the curing section 34. The third carrying unit 364 is used to lay the workpiece, that has passed through the curing section 34, from the end portion on the terminal point side of the delivery screws 363 to the jig putting-out unit 35. The fourth carrying unit 365 is used to deliver the workpiece, from which the masking jig has been removed by the jig putting-out unit 35, to the lift-down unit 12.

Figure 4:
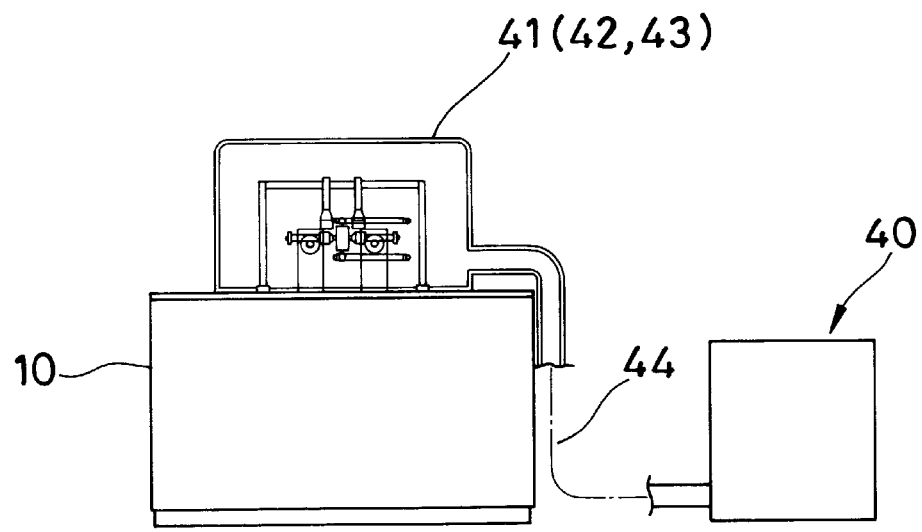
FIG. 4 is a view as viewed in the direction IV of FIG. 1.

Mounted on the upper surface of the base 10 are a first dust protecting cover 41 for covering the electrostic coater 32, a second dust protecting cover 42 for covering the workpiece outer circumference cleaner 33, and a third dust protecting cover 43 for covering the curing section 34. Each of the dust protecting covers 41 to 43 is openable/closable by a lid that is not shown. Also, a plurality of first jig cleaners 38 are provided along the upper delivery path 36 within the third dust protecting cover 43 which covers curing section 34. A second jig cleaner 39 is provided in the jig returning path 37. As best shown in FIG. 4, the inner spaces of the respective dust protecting covers 41 to 43, the second jig cleaner 39 and a hood of the electrostatic coater 32 to be described later are in communication with a powder coat collecting section 40 disposed outside of the base 10 through an intake manifold 44, respectively.

In the electrostatic powder coating apparatus according to this embodiment, the workpiece delivered to the workpiece feeding end portion 23a is first heated and degreased by the heating and degreasing 21 in a process for delivering the workpiece in the lower mechanism group 20 within the base 10 by the first lower delivery path 23, and thereafter, the workpiece is cooled in the cooling section 22. Subsequently, the workpiece is lifted up to the end portion of the upper delivery path 36 at the start point side (first carrying unit 361) on the base 10 by the lift-up unit 11. The workpiece is electrostatically coated with the powder coat in the process passing from the jig putting-in unit 31 of the upper mechanism group 30 through the respective parts to the jig putting-out unit. The workpieces which were cured were delivered again to the lower mechanism group 20 by the lift-down unit 12. The powder coat is molten and fixated (cured) by heating. The workpiece is cooled during the passage through the interior of the cooling section 22 by the second delivery path 24 and thereafter is discharged from the workpiece discharging portion 24a. Namely, in this embodiment, the respective parts from the workpiece feeding end portion 23a to the workpiece discharging section 24a are not arranged in line. Also, the apparatus is separated into the lower mechanism group 20 and the upper mechanism group 30 located above the lower mechanism group 20. In comparison with the conventional apparatus, the overall length of the apparatus is considerably decreased.

Incidentally, a series of operations of coating through the respective steps in the lower mechanism group 20 and the upper mechanism group 30 up to the discharge of the workpiece are controlled in sequence step by step by an internal sequence circuit. Reference numeral 13 denotes a control box for controlling the drive of each part such as the heating and degreasing section 21, the curing section 34 and the like and for controlling a voltage of the electrostatic coater 32 and the like.

Figure 5:
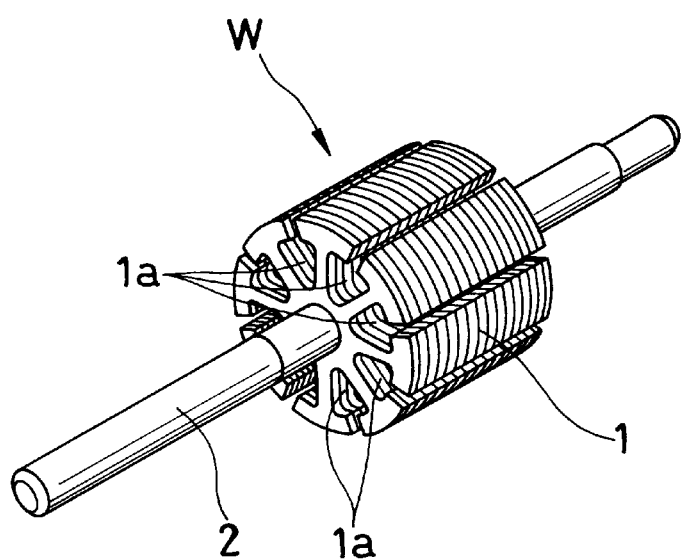
FIG. 5 is a perspective view showing a workpiece to be coated in the electrostatic powder coating apparatus according to the preferred embodiment.

FIG. 5 shows a workpiece w to be coated by the electrostatic powder coating apparatus according to this embodiment. This workpiece W is, for example, an armature of a compact DC motor which is composed of a cylindrical core 1 of multi-layered magnetic metal plates and a rotary shaft 2 passing through an axial portion of the core 1, projecting on both sides. A plurality of slots 1a are formed at an equal interval circumferentially in the core 1 for winding magnetically exciting wire lines. The insulation coating by the electrostatic powder coating apparatus is applied to the inner surface of each slot 1a, both end faces in the axial direction of the core 1, and the outer circumferential surface of the rotary shaft 2 in the vicinity of the core 1.

The schematic structure of the electrostatic powder coating apparatus according to this embodiment and the operation thereof will now be described.

Figure 6:
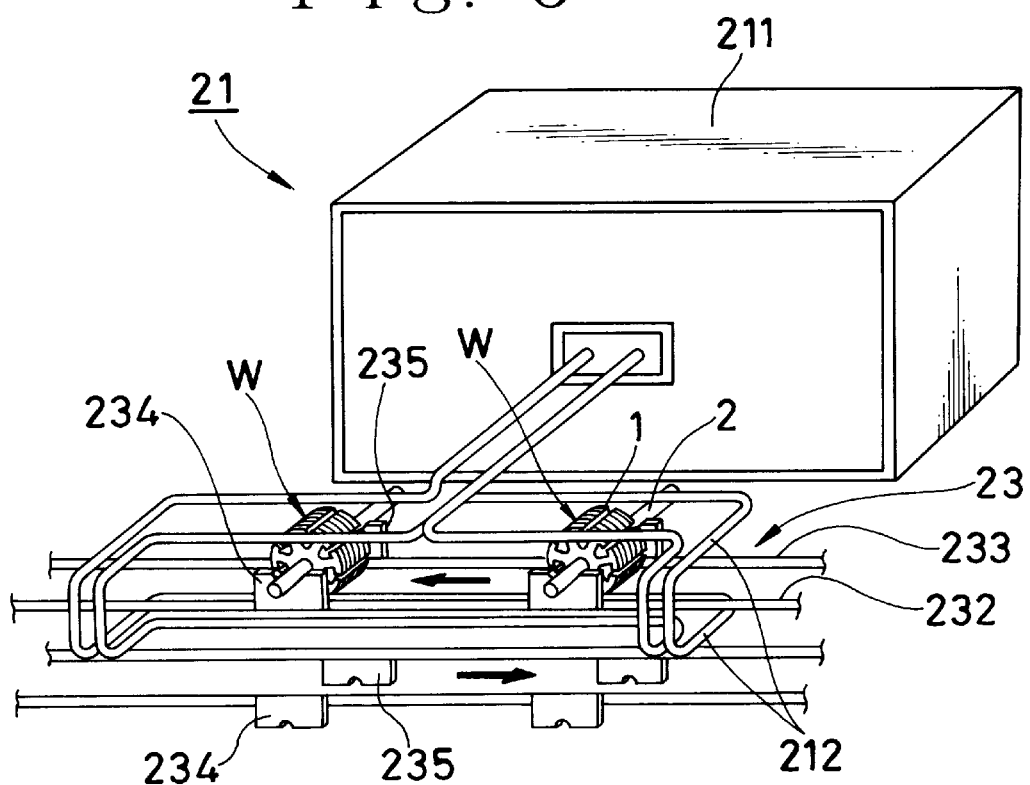
FIG. 6 is an illustration of a heating and degreasing section in the preferred embodiment.
Figure 7:
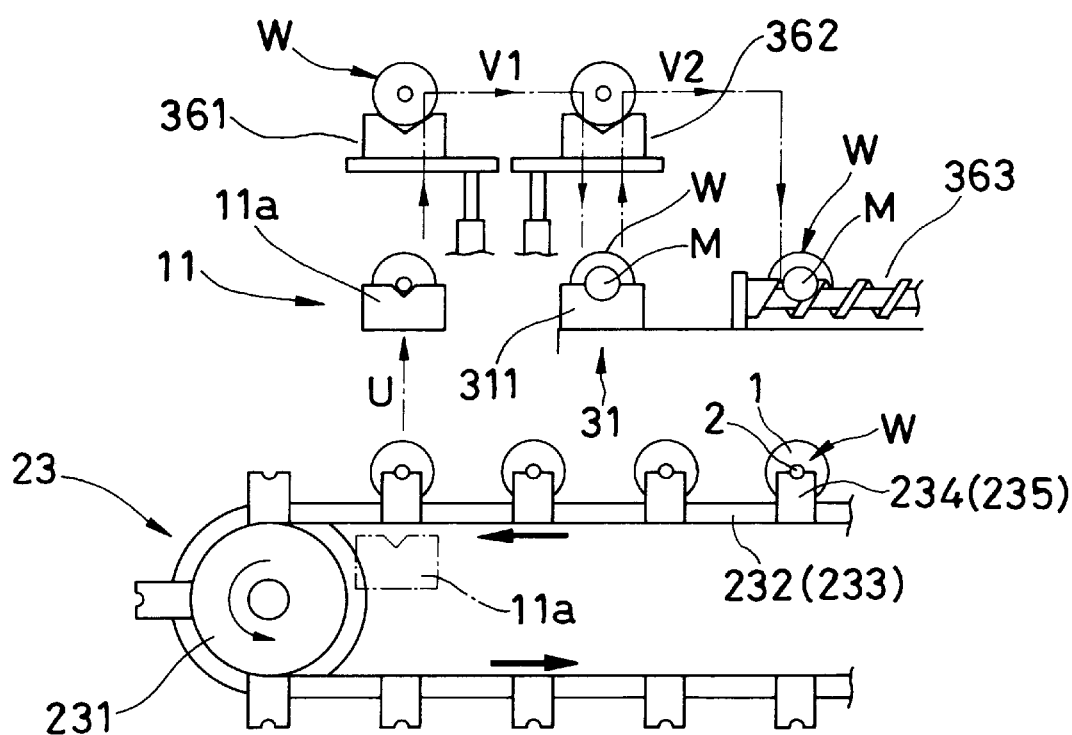
FIG. 7 is an illustration of the vicinity of the lift-up unit in the preferred embodiment.

The workpieces W which have been chemically washed are delivered in turn from a chemical cleaning device (not shown) to the workpiece feeding end portion 23a of the first lower delivery path 23 by a chuck device (not shown). As shown in FIGS. 6 and 7, the first lower delivery path 23 is composed of a pair of right and left rows of conveyers 232 and 233 raid around a wheel 231 that is driven by a continuously speed changing type motor and a number of pairs in the transverse direction of holders 234 and 235 in an equal interval in the longitudinal direction. The workpieces W are supported by the holders 234 and 235 at the rotary shaft 2 extending on both sides in the axial direction of the core 1 so that they are delivered in the horizontal direction on the conveyers 232 and 233 in the condition that the workpieces W are aligned in a single line. It should be noted that in order that the conveyers 232 and 233 and the holders 234 and 235 are caused to pass through the interior of the heating and degreasing section 21 using a high frequency wave heating method to be described later, these components are made of dielectric material. As a result, these components are not to be induction heated together with the workpieces W.

The heating and degreasing section 21 is composed of a high frequency generator 211 provided outside of the base 10, an oscillation coil 212 disposed within the base 10, and a casing 213 surrounding the oscillation coil 212. As shown in FIG. 6, in the heating and degreasing section 21, upper half portions of the conveyers 232 and 233 of the first lower delivery path 23 and the holders 234 and 235 extend through the space surrounded by the oscillation coil 212. Accordingly, the workpiece W made of magnetic material and transferred by the first delivery path 23 is induction heated in the process passing through the interior of the oscillation coil 212 at a predetermined velocity so that foreign objects such as oil or the like which causes the degradation of the coating are gasified. In particular, with respect to the core 1 having a structure in which a number of thin metal plates are laminated, it is difficult to completely remove the oil remaining between the respective metal plates by a normal chemical cleaning operation. It is however possible to effectively remove the oil or the like remaining in between the laminated metal plates by the above-described high frequency induction heating. The volatile oil is discharged from the casing 213 to a collecting and processing device (not shown).

The cooling section 22 is used to cool the workpiece w that has been heated by the heating and degreasing section 21 and/or the curing section 34. The cooling section 22 is composed of a casing 221 disposed within the base 10, and a suction pump 222 disposed outside of the base 10 for absorbing the air entrained in the casing 221.The first and second delivery paths 23 and 24 pass through the casing 221 substantially in the horizontal direction. Since there is a sufficient space relative to the horizontal direction within the base 10, a sufficient length in the delivery direction of the first and second delivery paths 23 and 24 is taken in the casing 221. Accordingly, the workpiece W may be cooled down to a temperature of a softening point of epoxy powder coat, to be described later, i.e., for example, cooled down reliably to 50° C. in the moving process from one side to the other side of the casing 221 by the first lower delivery path 23 and the second lower delivery path 24.

As shown by dot and dash lines U in FIG. 7, the lift-up unit 11 is operated for lifting up the workpiece W, delivered to the end portion on the terminal side by the first lower delivery path 23, toward the first carrying unit 361 that is the start point of the upper delivery path 36 above the base 10. For instance, the lift-up unit 11 is composed of a holder 11a for engaging with and supporting the rotary shaft 2 of the core 1 of the workpiece W on both sides and a drive portion (not shown) for moving reciprocatingly the holder 11a in the vertical direction.

As shown by dot and dash lines V1 in FIG. 7, the first carrying unit 361 in the upper delivery path 36 is operated for carrying the workpiece W, lifted up by the lift-up unit 11, onto a pair of stations 311 of the jig putting-in unit 31, and as shown by dot and dash lines V2 in FIG. 7, the second carrying unit 362 is operated for carrying the workpiece W, on which masking jig M are mounted at both ends of the rotary shaft 2 in the jig putting-in unit 31, onto the end portion on the start point of the delivery screws 363.

Figure 8:
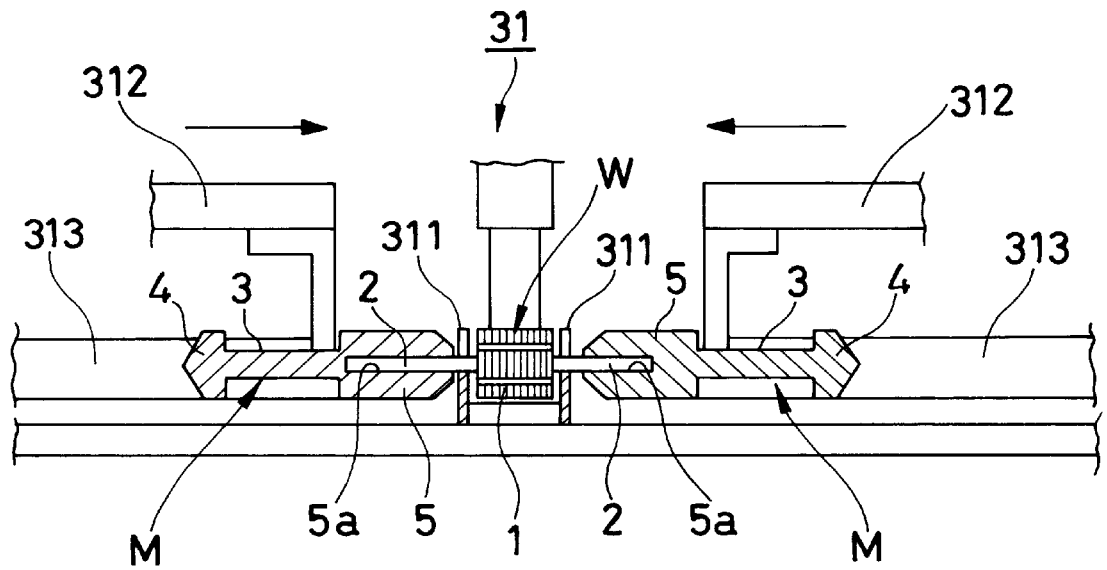
FIG. 8 is an illustration of a jig putting-in unit and masking jigs mounted on the workpiece in the preferred embodiment.

As shown in FIGS. 7 and 8, the jig putting-in unit 31 is composed of the pair of station 311 each having a V-shaped groove for supporting the rotary shaft 2 extending on both sides of the core 1 of the workpiece W received from the first carrying unit 361, a pair of chuck heads 312 for inserting and mounting the masking jigs M to the non-coated outer circumferential surfaces of both ends of the rotary shaft 2 from both sides of the stations 311, a pair of linear ball guide members 313 for guiding the linear movement in the mounting direction of the masking jigs M, and a jig detecting sensor (not shown) for detecting the absence/presence of the masking jigs M in the linear ball guide members 313 to stop the drive in the case where the masking jigs M are not detected. In each of the masking jigs M having conical flanged portions 4 and 5 are formed at both ends in the axial direction of metal made shaft portion 3, and a hole 5a is formed for inserting the rotary shaft into one end in the axial direction (on the side of the flange portion 5). Depending upon the length of the hole 5a, there are two kinds of the holes 5a; one hole for one end of the rotary shaft 2 and the other hole for another end thereof. The flange portion on the mounting side is formed of elastic material such as elastomer or the like. Accordingly, it is easy to insert the rotary shaft 2 into the hole and to prevent the powder coat from entering around the outer circumferential surface of the rotary shaft 2.

Namely, when the workpiece W is carried on the stations 311 of the jig putting-in unit 31 from the lift-up unit 11 by the first carrying unit 361, the masking jigs M are inserted and mounted to the portions of the rotary shaft 2 in the vicinity of both ends thereof in the workpiece 2 extending on both sides of the stations 311 by the chuck heads 312. The workpiece W on which the masking jigs M are mounted is moved above the end portion on the start point of the delivery screws 363 by the second carrying unit 362. At the same time, the first carrying unit 361 moves and carrys the next workpiece W, which has not yet been loaded with the jigs and lifted up by the lift-up unit 11, to the stations 311. Thus, the delivery of the workpieces W and the mounting the masking jigs M are carried out in turn.

Figure 9:
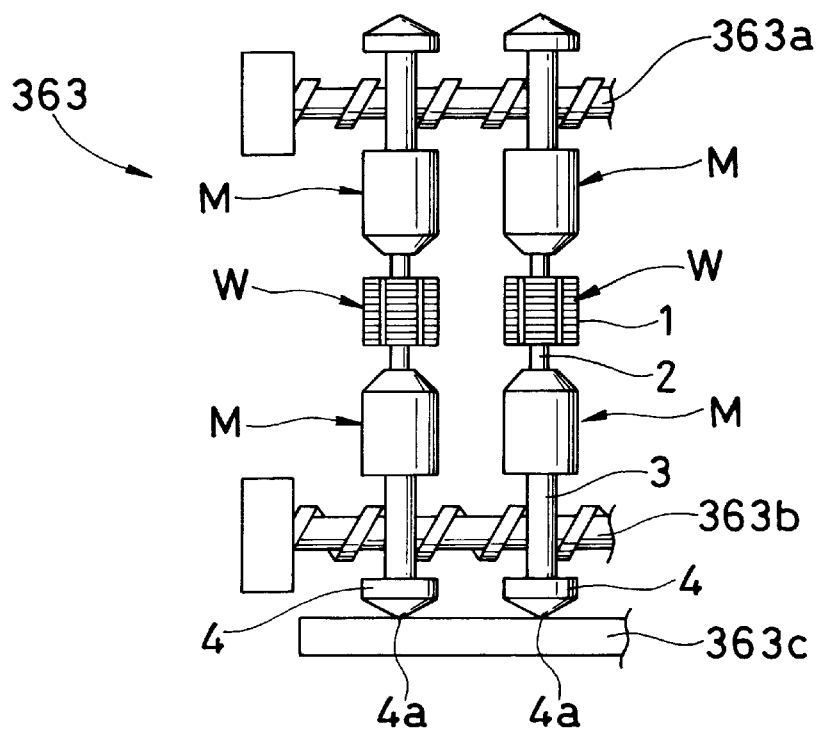
FIG. 9 is a plan view schematically showing a workpiece delivery condition by delivery screws in the preferred embodiment.
Figure 10:
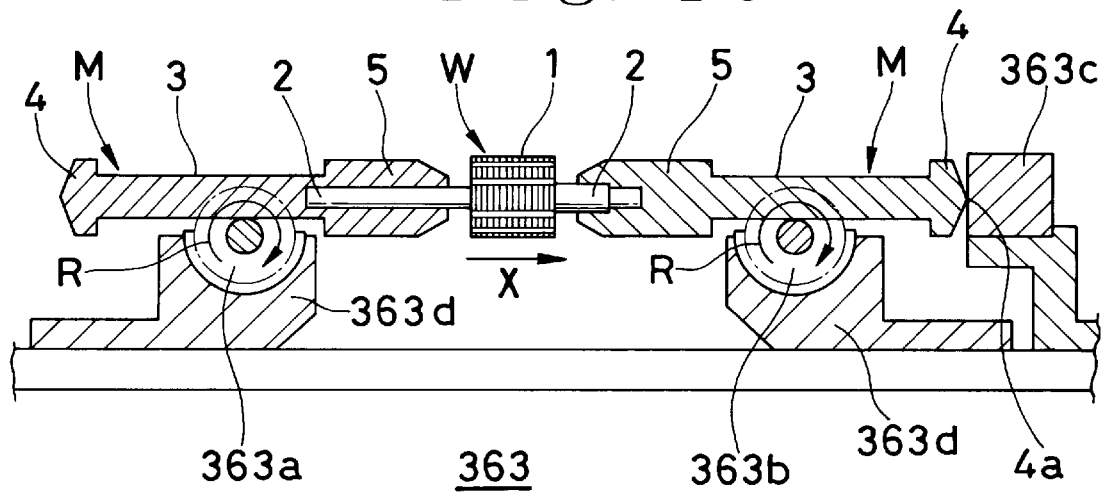
FIG. 10 is a view of the workpiece delivery state by the delivery screws as viewed in a direction in parallel with the delivery direction.

As shown in FIGS. 9 and 10, the delivery screws 363 in the upper delivery path 36 are provided with a pair of screw shafts 363a and 363b rotated by the continuous speed change type motor and mounted in the horizontal direction and in parallel with each other in the workpiece delivery direction, and a guide member 363c that is a rotation imparting portion which may contact with a central projection of the conical flange portion 4 on the non-mounting side (opposite to the workpiece W) of the masking jig M mounted on the workpiece W outside of one of the screws 363a. The part, passing through the electrostatic coater 32, of the screw shafts 363a and 363b are made of conductive metal. A hard chromium plating and buff process are applied to the surface thereof to form an extremely smooth surface condition. As a result, the adhesion of the powder coat is prevented in the electrostatic coater 32. The part, passing through the curing section 34 using the high frequency induction heating method to be described later, is made of dielectric material such as epoxy resin or the like reinforced with glass fibers in order not to be induction heated together with the workpiece W.

Namely, the workpiece W carried on the end portion on the start side of the delivery screws 365 from the stations 311 of the jig putting-in unit 31 by the first carrying unit 361 is transversely supported on the spiral grooves of the two screw shafts 363a and 363b through the masking jigs M mounted on both end portions of the rotary shaft 2, and is continuously delivered by the rotation thereof. Also, when the rotation is given in the direction of the arrow R in FIG. 10 to the two screw shafts 363a and 363b, the workpiece W is delivered in the axial direction by the screw propelling force of the above-described spiral grooves, and at the same time, the workpiece W is shifted in the direction indicated by the arrow X and perpendicular to the axes of the screw shafts 363a and 363b by the friction in the rotational direction. The apex portion 4a in the axis of the conical flange portion 4 of one of the masking jigs M is brought into contact with the guide member 363c. For this reason, the masking jig M generates a torque having a center in the axis of the rotary shaft 2 by the apex portion 4a in the axis of the flange portion 4 and by the outer circumferential surface of the shaft portion 3 to which the frictions of the screw shafts 363a and 363b is applied and the friction with the guide member 363c. The workpiece W is rotated around its own axis about the rotary shaft 2 by the torque in accordance with the delivery along the delivery screws 363.

Figure 11:
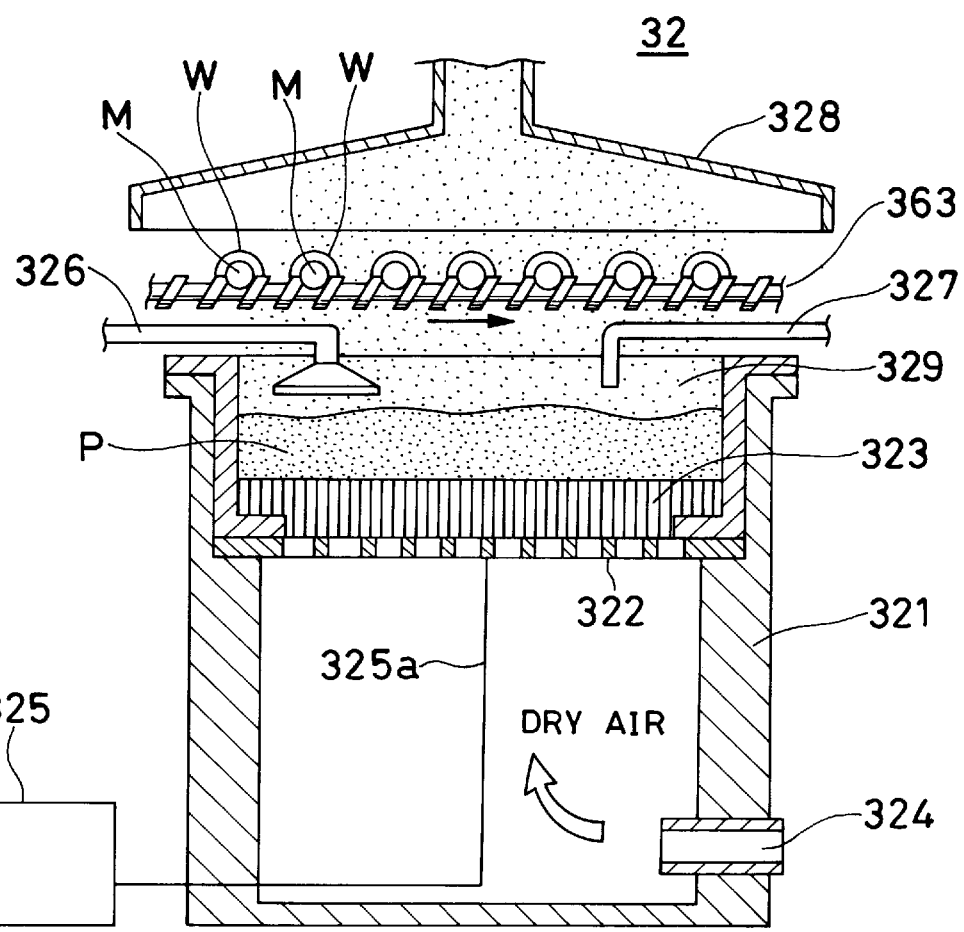
FIG. 11 is an illustration of an electrostatic coater in accordance with the preferred embodiment.

As shown in FIG. 11, the electrostatic coater 32 is provided with a case 321 opened at its upper end, an electrode plate 322 transversely supported at a predetermined height within the case 321, a porous plate 323 fixed on the electrode plate 322, an air supply hole 324 opened at the lower portion of the case 321 for feeding a dry air, a high voltage generator 325 connected to the electrode plate 322 through a cable 325a, a powder coat feeding pipe 326 for feeding powder coat (for example, epoxy resin powder) P to a chamber 329 on the porous plate 323, a level sensor 327 for detecting an amount of the powder coat P within the chamber 329, and a hood 328 dispose to face the upper opening of the case 321 and connected to the powder coat collection section 40 through the intake manifold 44 (see FIG. 3). The delivery screws 363 pass through the interior of the chamber 329 (between the case 321 and the hood 328). The high voltage generator 325 may change the voltage to be applied in the range of 0 to 58 kV.

Namely, in the electrostatic coater 32, when the high voltage generated in the high voltage generator 325 is applied to the electrode plate 322, the powder coat P is charged through the porous plate 323, and at the same time when the dry air is fed into the case 321 by a predetermined pressure from the air supply hole 324 to thereby raise the charged powder coat P, the particles P of the powder coat floating by the air flow raised toward the hood 328 from the porous plate 323 are repulsive to each other due to the same polarity of the particles to thereby be distributed substantially uniformly within the chamber 329. On the other hand, the workpiece W delivered and supported through the masking jigs M on the delivery screws 363 is grounded through the masking jigs M and the delivery screws 363. Accordingly, during the passage of pipes of the workpiece w through the chamber 329, the charged powder coat P is electrostatically adhered to the surfaces of the workpieces W other than the masking portions of the masking jigs M by Coulomb Law.

The extra powder coat that has passed upwardly without adhering to the workpieces W is once absorbed and collected through the hood 328 to the powder coat collecting section 40 and is to be reused. The powder coat P that has flowed from between the case 321 and the hood 328 is prevented from flowing out of the apparatus by the first dust protecting cover 41 covering the outside of the electrostatic coater 32 and is absorbed and collected from the first dust protecting cover 41 through the intake manifold 44 to the above-described powder coat collecting section 40 to be reused.

The amount of the powder coat P within the chamber 329 is normally detected by the level sensor 327 and the powder coat P is replenished from the powder coat feeding pipe 326 on the basis of the detection of the level sensor 327. For this reason, the powder coat P within the chamber 329 is always kept constant so that the adhesion of the powder coat P to the workpieces W is performed in a stable manner. A clean and dry air that has been filtrated by a micro filter within a refrigerating type air drier 50 and that has been dehumidificated by the air drier 50 is fed as the air fed from the air supply hole 324 for raising the powder coat P within the chamber 329.

As described above, since, in the process for delivering the workpiece W within the chamber 329 of the electrostatic coater 32 by the delivery screws 363, the workpiece W is rotated about the axis of the rotary shaft 2 in contact with the masking jig M and the guide member 363C, the electrostatic adhesion of the powder coat P is performed uniformly around the outer periphery, and the formation of the powder coat layer within each slot 1a is performed extremely uniformly. In addition, the rotation of the workpiece W is not attained by any other rotary means or the like, which leads to saving of the energy.

Figure 12:
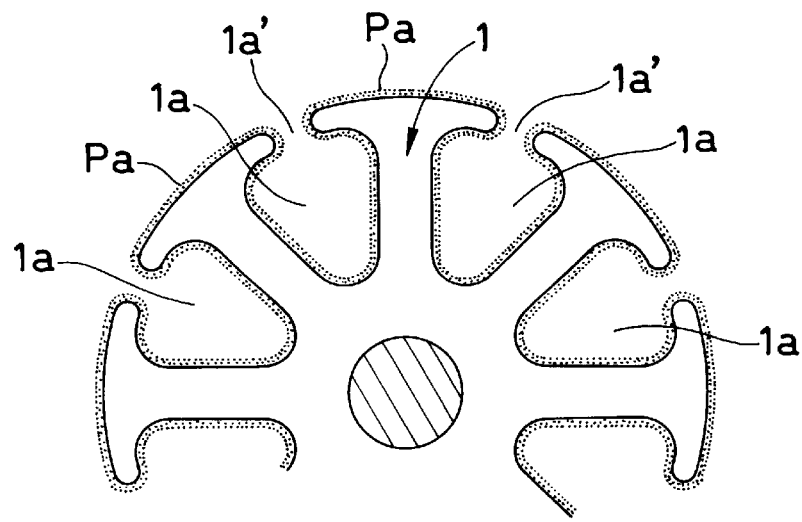
FIG. 12 is an illustration of the powder coated adhesion state of the workpiece surface by the electrostatic coater.

Also, when the powder coat layer Pa formed around the outer circumference of the core 1 during the process for delivering the workpiece W within the chamber 329 is gradually increased, a narrow opening portion 1a' of each slot 1a is further narrowed as shown in FIG. 12. Accordingly, the powder coat P is hardly introduced into the slot 1a. However, the powder coat layer Pa electrostatically adhered to the outer circumference of the core 1 is normally removed by a scraper (not shown) disposed within the chamber 329. For this reason, it is possible to enhance the adhesion efficiency of the powder coat P within the interior of each slot 1a.

Figure 13:
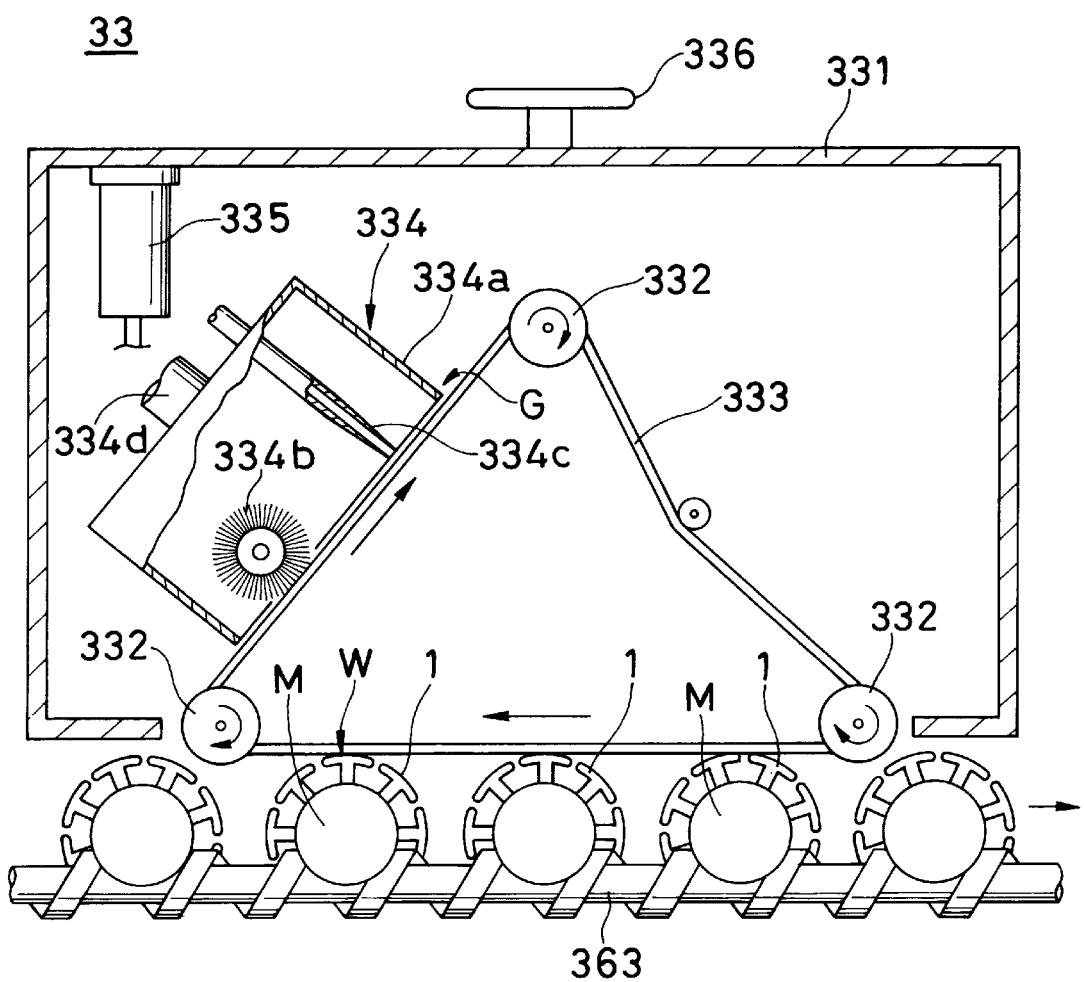
FIG. 13 is an illustration showing a workpiece outer circumference cleaner in the embodiment.

As shown in FIG. 13, the workpiece outer circumference cleaner 33 is composed of a casing 331 opened at its lower end, a synthetic resin made endless belt 333 recirculated and moved in the inner chamber of the casing 331 by a plurality of rollers 332 provided within the casing 331 and exposed through the lower end opening portion of the casing 331 at its lower portion along the horizontal movement path to be brought into contact with the outer circumference of the core 1 of the workpiece W on the delivery screws 363, a collector 334 disposed outside of the endless belt 333 at the upper portion of the movement path, and a cylinder 335 and a manual handle 336 for adjusting a contact height of the endless belt 333 in response to the outer diameter of the core 1 of the workpiece W.

The collector 334 is composed of a cover 334a having an opening disposed to face the surface of the endless belt 333, a rotary brush 334b disposed in the cover 334a for scraping the powder coat on the surface of the endless belt 333, an air nozzle 334c for spraying compression air toward the surface of the endless belt 333, and an intake port 334d for absorbing the powder coat that has been removed from the surface of the endless belt 333. The compression air fed to the air nozzle 334c is simultaneously dehumidificated and cleaned by the above-described refrigerating type air drier 50. The intake port 334d is connected to the above-described powder coat collection section 40 through a duct pipe formed of conductive material for avoiding the electrostatic adhesion of the charged powder coat P.

A certain amount of the powder coat P is electrostatically adhered to the outer circumferential surface of the core 1 of the workpiece W that has passed through the chamber 329 of the electrostatic coater 32 by the delivery screws 363. The powder coat P is transferred to the endless belt 333 and removed, the endless belt 333 contacting the workpiece W during the passage of pipes of the workpiece W under the lower side of the workpiece outer circumference cleaner 33. The powder coat adhered to the endless belt 333 is removed by the scraping operation of the rotary brush 334b within the collector 334 and the compression air fed from the air nozzle 334c, and is once absorbed and collected to the powder coat collecting section 40 through the intake port 334d from the interior of the cover 334a to be reused. The powder coat P that has flowed from the opening portion gap G of the cover 334a of the collector 334 is prevented from flowing out of the apparatus by the second dust protecting cover 42 for covering the entire workpiece outer circumference cleaner 33 and is absorbed and collected to the powder coat collecting section 40 through the intake manifold 44 from the second dust protecting cover 42.

Figure 14:
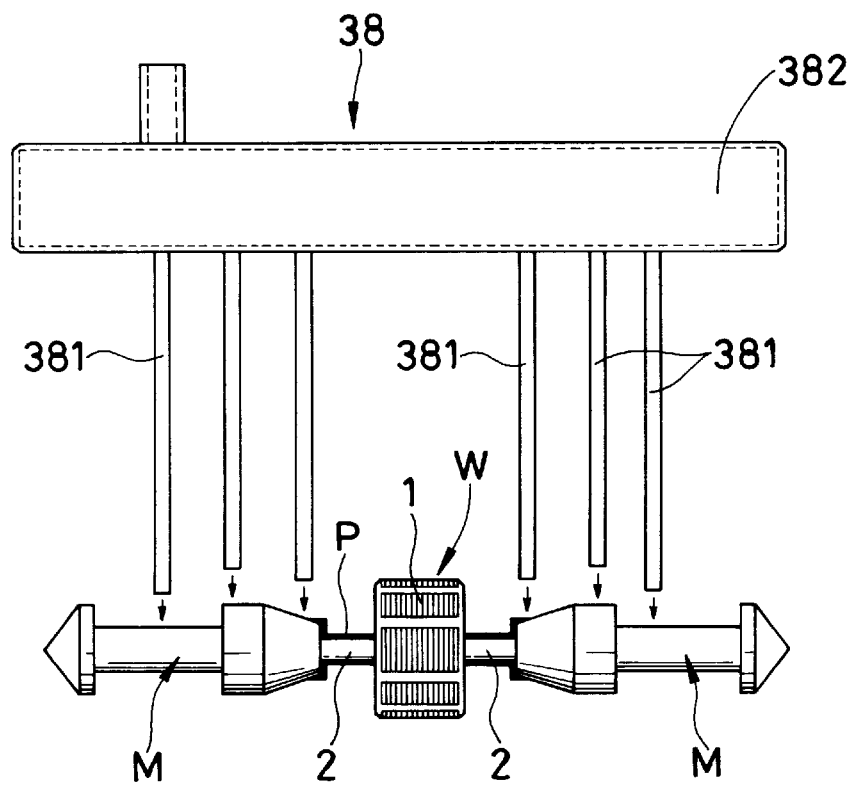
FIG. 14 is an illustration of a first jig cleaner in the embodiment.

A plurality of first jig cleaners 38 are disposed along the upper delivery path 36 within the third dust protecting cover 43 for covering the outside of the oscillation coil to be described later in the curing section 34. As shown in FIG. 14, each first jig cleaner 38 is composed of a plurality of air nozzles 381 disposed to face the outer circumferential surfaces of the masking jigs M mounted on both end potions of the rotary shaft 2 of the workpiece W, and a manifold 382 for branching and feeding the compression air to the air nozzles 381. Also, the compression air fed to the first jig cleaner 38 is dehumidificated and cleaned by the above-described refrigerating air drier 50.

Namely, the masking jigs M are made of material that makes it difficult to electrostatically adhere the powder coat P. However, it is inevitable to adhere the powder coat P to some extent. Accordingly, the first jig cleaners 38 are used to remove a small amount of the powder coat which is adhered to the masking jigs M by using the spray of the compression air. For this reason, the formation of burrs, in the surfaces of the masking jigs M, caused by the curing operation to be described later is prevented. It is therefore possible to repetitively use the masking jigs M. The powder coat P diffused from the surfaces of the masking jigs M by the spray of the compression air is prevented from flowing out of the apparatus by the third dust protecting cover 43 and is absorbed and collected to the powder coat collecting section 40 through the intake manifold 44.

Figure 15:
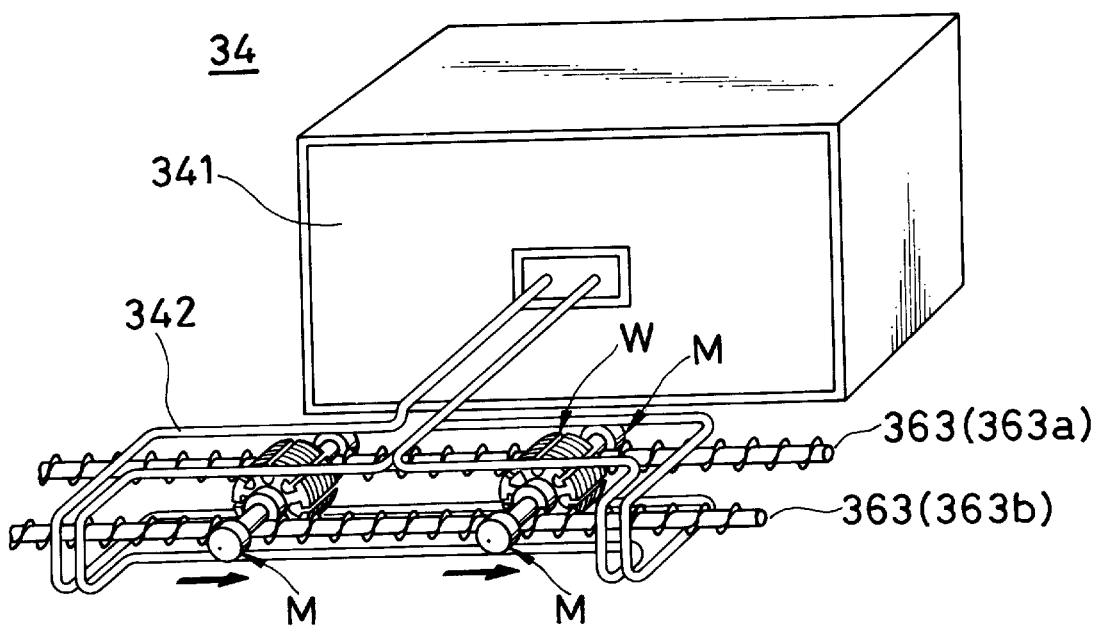
FIG. 15 is an illustration of a curing section in the embodiment.

The curing section 34 has the structure same to that of the above-described heating and degreasing section 21. Namely, the curing section 34 is provided with a high-frequency oscillator 341 disposed outside of the base 10 shown in FIG. 3, and an oscillation coil 342 disposed within the third dust protecting cover 43 on the base 10. As shown in FIG. 15, in the curing section 34, the delivery screws 363 extend through the space surrounded by the oscillation coil 342. Accordingly, since the workpiece W made of magnetic material and delivered by the delivery screws 363 is induction heated during the passage of pipes of the oscillation coil 342, the particles of the powder coat layer composed of thermosetting epoxy resin powder electrostatically adhered to the surface are once molten and bonded to each other to be gel and to be polymerized. The particles are set in a cross-linkage to form insulation coating films by the thermosetting reaction.

Incidentally, of the surfaces of the workpieces W, the surfaces other than those of the portions of the rotary shaft 2 close to the core 1 are masked by the masking jigs M. The powder coat is not adhered to the portions. Also, the powder coat adhered to the outer circumferential surfaces of the core 1 is removed by the above-described workpiece outer circumference cleaner 33. Accordingly, the insulation coating film is formed only on the both end faces in the axial direction and the inner surfaces of the respective slots 1a and the outer circumferential surface of the rotary shaft 2 on the core 1 side. Then, since the insulation coat film formed on the inner surface of the respective slots 1a has a uniform thickness, the rotary balance of the workpiece w to be assembled as an armature of a motor is considerably enhanced.

When the workpiece W coming from the third dust protecting cover 43 in the curing section 34 has reached the vicinity of the end portion on the terminal point side of the delivery screws 363, the workpiece w is carried to the jig putting-out unit 35 by the third carrying unit 364 and further carried from the jig putting-out unit 35 to the lift-down unit 12 by the fourth carrying unit 365. The third carrying unit 364 and the fourth carrying unit 365 are constructed in the same way as in the first and second carrying units 361 and 362, and are operated in the same way.

Figure 16:
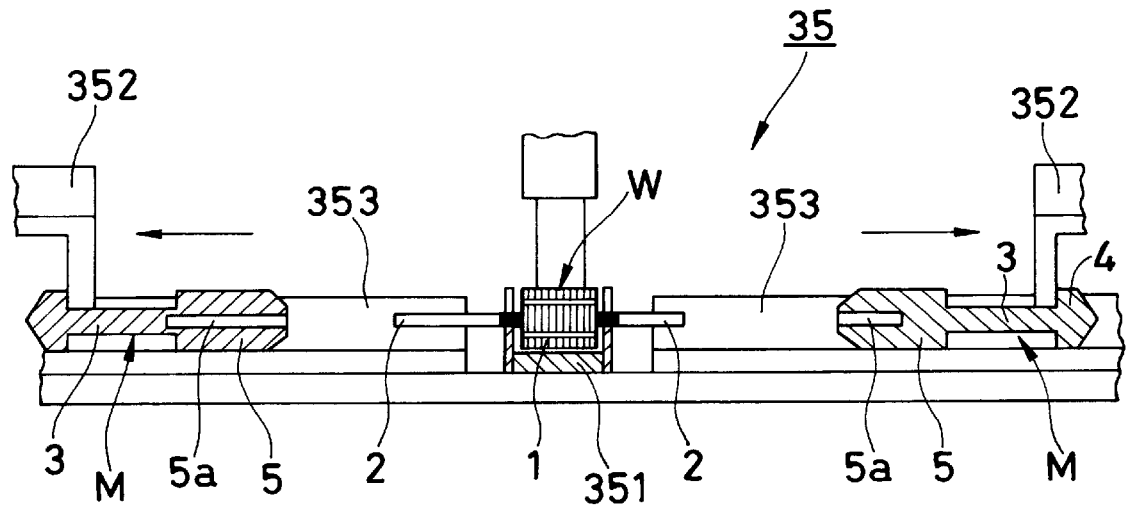
FIG. 16 is an illustration of a jig putting-out unit in the embodiment.

As shown in FIG. 16, the jig putting-out unit 35 is constructed in the same way as in the above-described jig putting-in unit 31. The jig putting-out unit 35 receives the workpiece W to be carried from the vicinity of the end portion on the terminal point side of the delivery screws 363 by the third carrying unit 364 and is composed of a station 351 for supporting the core 1 from below, a pair of chuck heads 352 located on both sides of the station 351 for pulling out the masking jigs M mounted on both end portions of the rotary shaft 2 of the workpiece W, and a pair of linear ball guide members 353 for guiding the movement of the masking jig M in the pulling-out direction.

Figure 17:
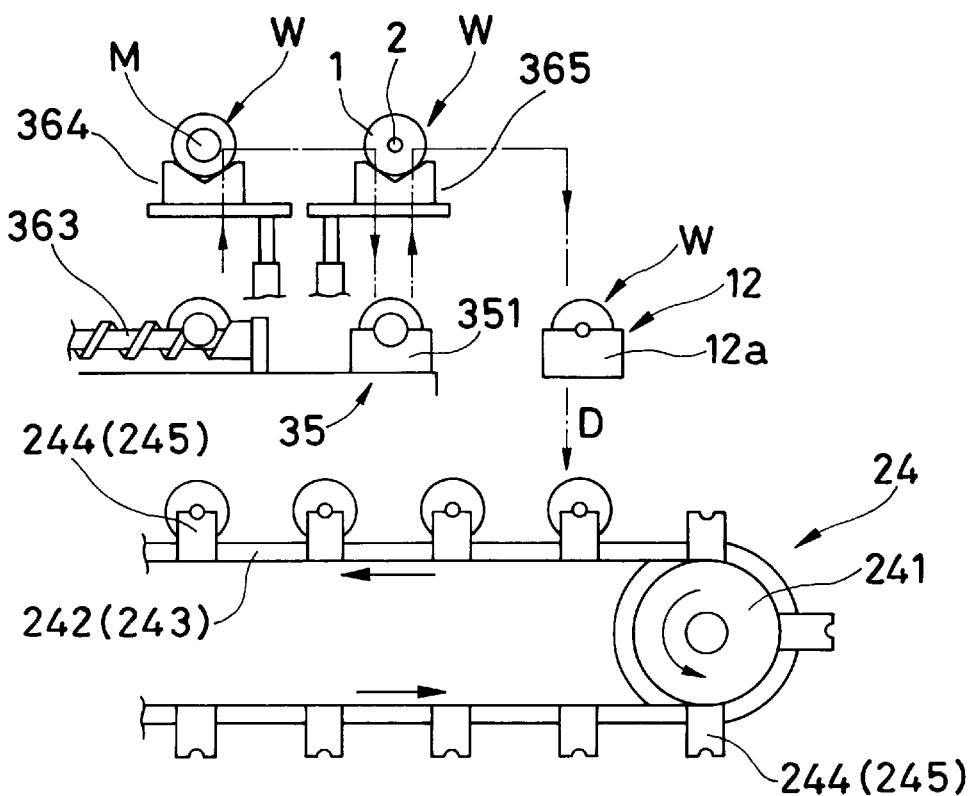
FIG. 17 is an illustration of a lift-down unit in the embodiment.

Namely, when the workpiece W is carried on the station 351 of the jig putting-out unit 35 from the vicinity of the end portion on the terminal point side of the delivery screws 363 by the third carrying unit 364, the pair of masking jigs extending on both sides of the station 351 are pulled out from the rotary shaft 2 of the workpiece W while engaging with the chuck heads 352. As shown in FIG. 17, the workpiece W from which the masking jigs M have been removed is carried to the holder 12a of the lift-down unit 12 by the fourth carrying unit 365. Simultaneously with this carrying movement, the next workpiece W that has been coated and loaded with the masking jigs M is carried onto the station 351 by the third carrying unit 364. Thus, the delivery of the workpiece W and the removal of the masking jigs M are carried out in turn.

The workpiece W that has carried to the holder 12a of the lift-down unit 12 by the fourth carrying unit 365 and from which the masking jigs M have been removed is lifted down in turn in the direction indicated by the arrow D on the end portion on the start point side of the second lower delivery path 24 in the lower mechanism group 20 within the base 10 by the lift-down unit 12. The lift-down unit 12 has substantially the structure same to that of the above-described lift-up unit 11. In the same manner as in the above-described first lower delivery path 23, the second lower delivery path 24 is composed of a pair of two rows of conveyers 242 and 243 laid around a wheel 241, and a number of holders 244 and 245 disposed on the conveyers 242 and 243 in an equal interval in the longitudinal direction while forming a pair in the transverse direction. The rotary shaft 2 of workpiece W extending on both sides in the axial direction of the core 1 is supported by the above-described holders 244 and 45 and is horizontally delivered on the conveyers 242 and 243 in the aligned condition in a row.

Figure 18:
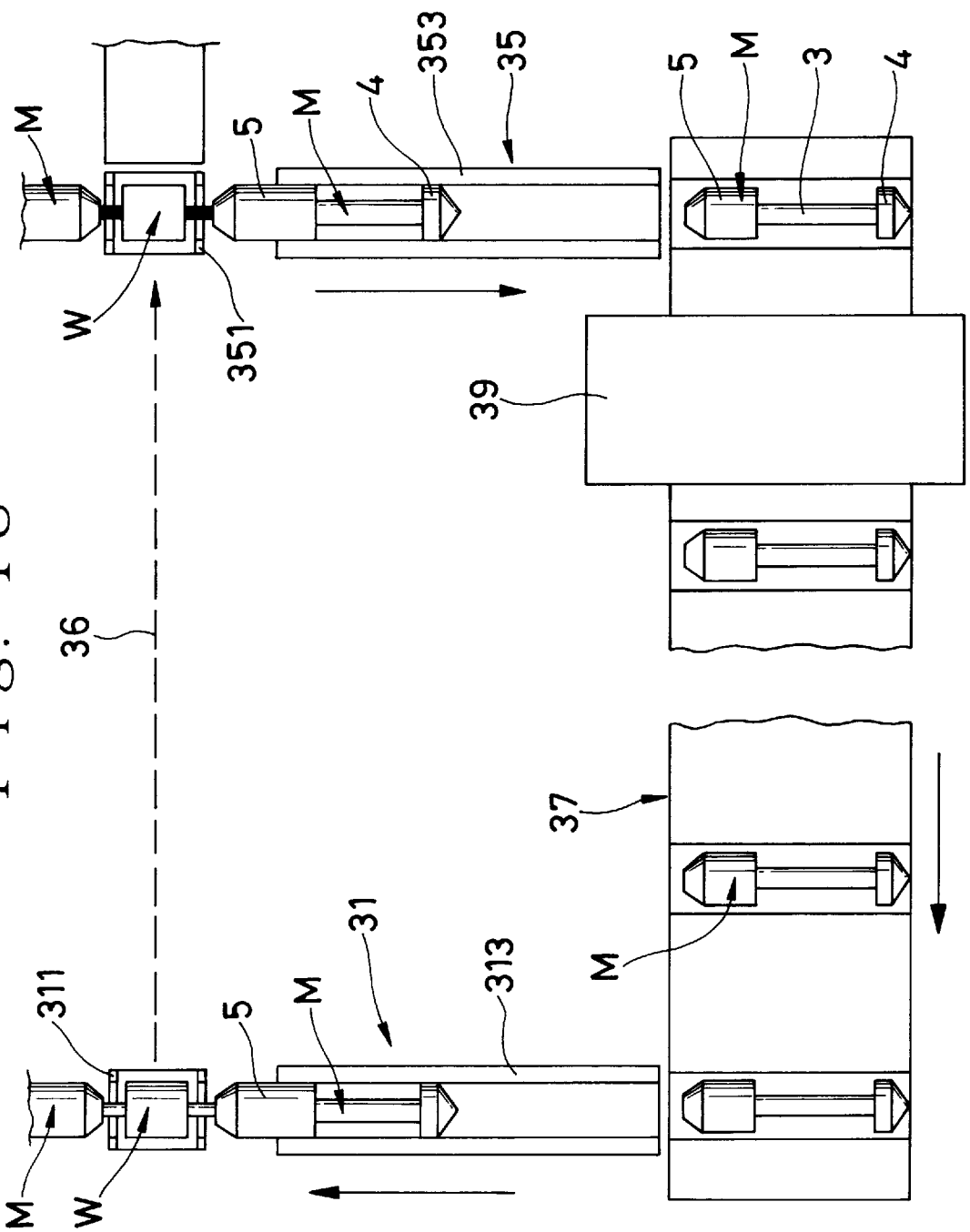
FIG. 18 is an illustration of a jig returning section together with the jig putting-out unit and the jig puttingin unit in the embodiment.
Figure 19:
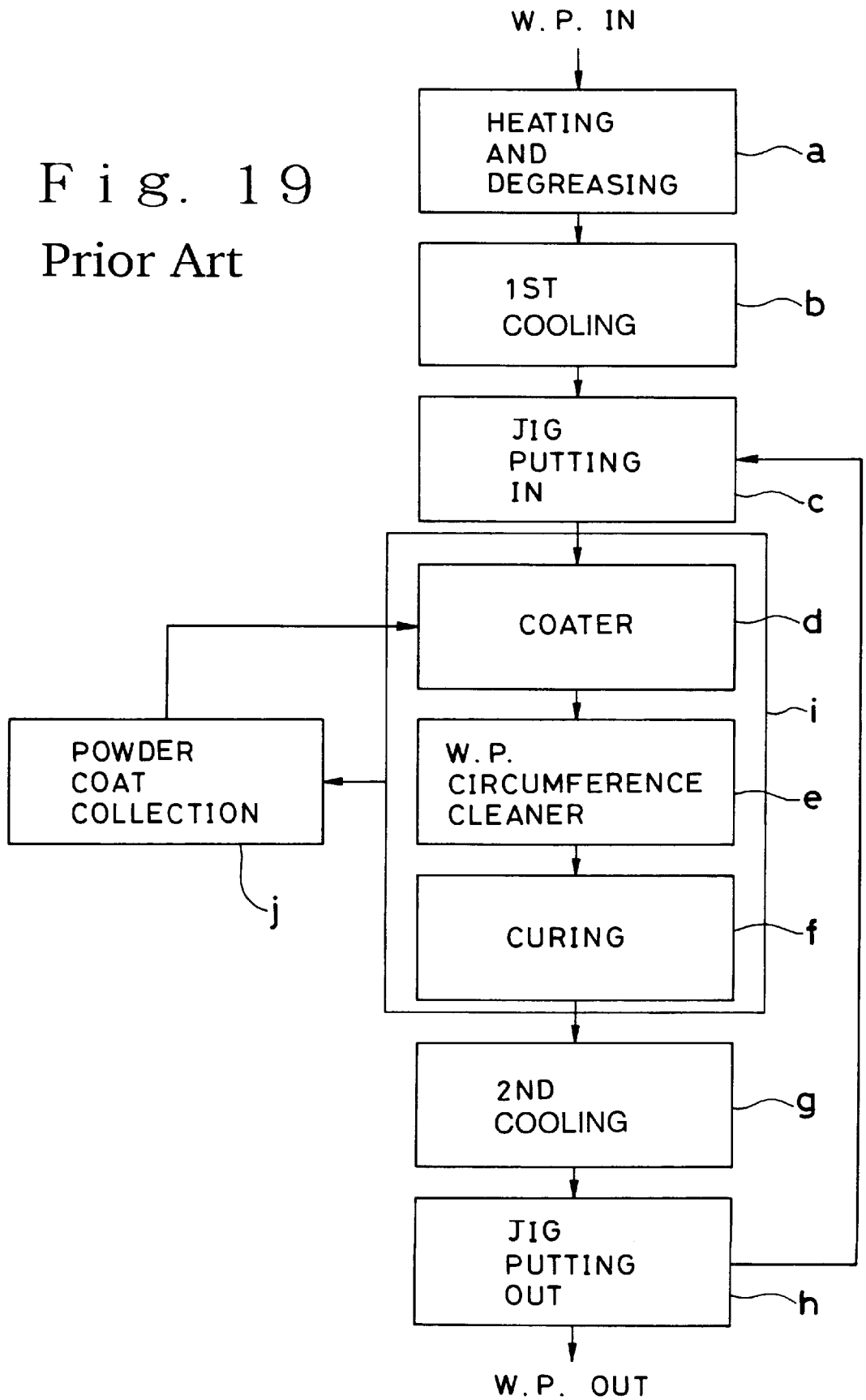
FIG. 19 is an illustration showing respective sections of the prior art apparatus.

On the other hand, the masking jigs M that have been pulled apart from the workpiece W in the jig putting-out unit 35 are returned back to the jig putting-in unit 31 by the jig returning path 37 to be reused. As shown in FIG. 18, the jig returning path 37 is composed of the linear ball guide member 353 of the jig putting-out unit 35 and a pair of conveyers (only one thereof shown in FIG. 18) disposed in parallel on both sides of the upper delivery path 36, in a direction perpendicular to the linear ball guide member 313 of the jig putting-in unit 31.

The masking jigs M pulled apart from the workpiece W by the jig putting-out unit 35 are delivered toward the jig putting-in unit 31 on and along the jig returning path 37 in the same posture, i.e., under the condition that the flange 5 on the mounting side is directed to the upper delivery returning path 37. Incidentally, the series of returning operations from pulling-out the masking jigs M from the workpiece W by the jig putting-out unit 35 to loading of the masking jigs M to the workpiece W by the jig putting-in unit 31 are carried out in synchronism with each other on both sides.

The second jig cleaner 39 provided in the midway of the jig returning path 37 is used to perform again the cleaning by spraying the compression air in the process for returning the masking jigs M from which the powder coat P on the surface has been removed by the first jig cleaners 38 within the third dust protecting cover 43 in the curing section 34 after the masking jigs M has been removed from the workpiece W in the jig putting-out unit 35. In particular, in the second jig cleaner 39, the powder coat P remaining in the end face portion of the flange portion 5 on the insertion side or the hole 5a into which the rotary shaft 2 of the workpiece W is inserted are mainly removed. The removed residual powder coat P is absorbed and collected to the powder coat collecting section 40 through the intake manifold 44 (see FIG. 3).

The workpiece W that has been heated up to a high temperature by the induction heating in the process passing through the oscillation coil 342 of the curing section 34 is gradually cooled by the natural heat radiation in the process for delivering the workpiece W along the second lower delivery path 24 through the third carrying unit 364, the fourth carrying unit 365 and the lift-down unit 12 from the delivery screws 363. However, the workpiece W is caused to pass again through the cooling section 22 (see FIGS. 1 and 2) and cooled down in the delivery process in the second lower delivery path 24. As a result, the workpiece W is cooled down to a room temperature. Namely, the cooling section 22 is also provided with the cooling means after the workpiece W before coating is heated and degreased in the heating and degreasing section 21 and the cooling means after the powder coat P electrostatically adhered to the workpiece W is cured.

The powder coat collecting section 40 is composed of a cyclone 40a, a powder feeder (not shown) and a dust collector 40b. The air flow containing the powder coat absorbed from the hood 328 of the electrostatic coater 32, the first through third dust protecting covers 41 to 43, the second jig cleaner 39 and the like through the intake manifold 44 by the dust collector 40b is swirled along the inner circumferential surface of the cyclone 40a having a conical hopper in the tangential direction within the cyclone 40a. At this time, the powder coat is separated by the centrifugal force and collected in the above-described powder feeder. The collected powder coat is fed to the chamber 329 of the electrostatic coater 32 through the powder coat feeding portion 326.

Also, since the electrostatic coater 32, the workpiece outer circumference cleaner 33 and the curing section 34 are covered by the independent dust protecting covers 41 to 43, respectively, the powder coat is hardly left in the respective dust protecting covers 41 to 43, and the powder coat is effectively absorbed and collected by the powder coat collecting section 40.

The coated workpiece W which has been sufficiently cooled through the cooling section 22 during the passage of pipes on the second lower delivery path 24 reaches the workpiece discharging section 24a of the second lower delivery path 24, and thereafter is discharged through a chute (not shown) or the like to be delivered to the next step.

Incidentally, the present invention is not limited to the embodiment shown. For example, the conveyers and the screw shafts constituting the workpiece delivery paths or other detailed structures may be changed. For instance, the delivery paths through the electrostatic coater 32 and the curing section 34 may be formed by chains or belts other than the delivery screws.

The electrostatic powder coating apparatus according to the present invention has the following advantages.

(i) Since the workpiece cooling after the heating and degreasing and the workpiece cooling after the curing operation are performed in the single cooling section, it is possible to make compact the apparatus in comparison with the conventional apparatus.

(ii) The coating mechanism such as the electrostatic coater and the curing section are disposed on the upper side of the heating and degreasing section and the cooling section, the overall length of the apparatus is considerably shortened in comparison with the conventional apparatus in which the respective sections are connected linearly in series.

(iii) For the reason described in the item (ii), since the cooling section may be elongated relative to the workpiece delivery direction, it is possible to sufficiently cool the heated workpiece.

(iv) Since the electrostatic coater, the workpiece outer circumference cleaner and the curing section are covered by the independent dust protecting covers, respectively, the absorption and collection efficiency of the powder coat by the powder coat collecting section is enhanced, it is possible to reduce the amount of adhesion of the powder coat to the inner surfaces of the dust protecting covers and the surfaces or the like of the equipment covered by the dust protecting covers.

Various details of the invention may be changed without departing from its spirit or scope. Furthermore, the foregoing description of the embodiments according to the present invention is provided for the purpose of illustration only, and not for the purpose of limiting the invention as defined by the appended claims and their equivalents.

What is claimed is:

1. An electrostatic powder coating apparatus comprising:
   a heating and degreasing section for heating and degreasing a workpiece;
   an electrostatic coater for electrostatically adhering powder coat to a surface of the workpiece;
   a curing section for heating and melting a layer of the electrostatically adhering powder coat to the surface of the workpiece for fixation thereto;
   a cooling section for cooling the workpiece which has been heated and degreased and the workpiece which has been cured;
   means for delivering the workpiece along a path through respective sections of the apparatus including the heating and degreasing section, the electrostatic coater, the curing section and the cooling section; wherein the path through the cooling section is composed of a first delivery path passing from the side of the heating and degreasing section through the cooling section to the side of the electrostatic coater, and a second delivery path passing from a side of the curing section through said cooling section to a workpiece discharging side;
   an upper mechanism group including the electrostatic coater and the curing section is arranged on an upper side of a lower mechanism group including the heating and degreasing section and the cooling section;
   means for lifting a workpiece that has been delivered to an end portion on a terminal point side of the first delivery path passing through the lower mechanism group up to an end portion on a start point side of the upper delivery path passing through the upper mechanism group; and
   means for lowering a workpiece that has been delivered to the end portion on the terminal point side of the upper delivery path down to the end portion on the start point side of the second delivery path passing through the lower mechanism group.

2. An electrostatic powder coating apparatus, comprising:
   an electrostatic powder coating apparatus comprising:
   a heating and degreasing section for heating and degreasing a workpiece;
   an electrostatic coater for electrostatically adhering powder coat to a surface of the workpiece;
   a curing section for heating and melting a layer of the electrostatically adhering powder coat to the surface of the workpiece for fixation thereto;
   a cooling section for cooling the workpiece which has been heated and degreased and the workpiece which has been cured;
   means for delivering the workpiece along a path through respective sections of the apparatus including the heating and degreasing section, the electrostatic coater, the curing section and the cooling section; wherein the path through the cooling section is composed of a first delivery path passing from the side of the heating and degreasing section through the cooling section to the side of the electrostatic coater, and a second delivery path passing from a side of the curing section through said cooling section to a workpiece discharging side;

an upper mechanism group including the electrostatic coater and the curing section is arranged on an upper side of a lower mechanism group including the heating and degreasing section and the cooling section;

means for lifting a workpiece that has been delivered to an end portion on a terminal point side of the first delivery path passing through the lower mechanism group up to an end portion on a start point side of the upper delivery path passing through the upper mechanism group; and means for lowering a workpiece that has been delivered to the end portion on the terminal point side of the upper delivery path down to the end portion on the start point side of the second delivery path passing through the lower mechanism group;

a workpiece outer circumference cleaner disposed between the electrostatic coater and the curing section for removing an extra amount of the powder coat from a workpiece outer circumferential surface;

a jig cleaner disposed in the curing section for removing the powder coat on a surface of masking jigs mounted on the workpiece;

the electrostatic coater, the workpiece outer circumference cleaner and the curing section being covered by independent dust covers, respectively; and wherein the powder coat within the respective dust covers is removed from the dust covers to a powder coat collecting section through pipes leading from the dust covers to the collecting section.

* * * * *